E. E. NORTON.
MACHINE FOR INSERTING STAYS IN CORSETS.
APPLICATION FILED AUG. 13, 1913.

1,154,200.

Patented Sept. 21, 1915.
6 SHEETS—SHEET 1.

Fig. 1

E. E. NORTON.
MACHINE FOR INSERTING STAYS IN CORSETS.
APPLICATION FILED AUG. 13, 1913.

1,154,200.

Patented Sept. 21, 1915.
6 SHEETS—SHEET 5.

INVENTOR
Eugene E. Norton
BY
F. M. Wooster
ATTORNEY

WITNESSES:
H. W. Meade
S. W. Atherton

E. E. NORTON.
MACHINE FOR INSERTING STAYS IN CORSETS.
APPLICATION FILED AUG. 13, 1913.

1,154,200.

Patented Sept. 21, 1915.
6 SHEETS—SHEET 6.

WITNESSES:
H. W. Meade
S. W. Atherton.

INVENTOR
Eugene E. Norton
BY
A. M. Wooster
ATTORNEY

UNITED STATES PATENT OFFICE.

EUGENE E. NORTON, OF BRIDGEPORT, CONNECTICUT.

MACHINE FOR INSERTING STAYS IN CORSETS.

1,154,200.  Specification of Letters Patent.  Patented Sept. 21, 1915.

Application filed August 13, 1913.  Serial No. 784,574.

*To all whom it may concern:*

Be it known that I, EUGENE E. NORTON, a citizen of the United States, residing at Bridgeport, county of Fairfield, State of Connecticut, have invented an Improvement in Machines for Inserting Stays in Corsets, of which the following is a specification.

This invention has for its object to produce a machine provided with a plurality of magazines for containing corset stays of different lengths and widths and with mechanism for inserting a stay from any of the magazines, or two stays simultaneously, in a corset.

With this end in view my invention consists in certain constructions and in certain parts, improvements and combinations, which will be hereinafter described and then particularly pointed out in the claims hereunto appended.

In the accompanying drawings forming a part of this specification.

The stays, bones, steels or wires, as they are variously termed, are placed in tubular magazines 50 which lie in the horizontal plane. These magazines may be made of sheet metal and are rigidly secured to circular flanges 51 which are cast integral with a back plate 52, are open at the bottom and are provided with downwardly extending lips 53. The metal of the magazines extends downward between the lips in parallel extensions forming a receiver 54 for each magazine, into which the stays drop. The magazines are cylindrical and are placed in vertical columns, three columns of magazines being shown in the present instance, and the stays are placed in the magazines through doors 55 which are hinged to the front 56 to swing downward, each door covering a row of magazines in the several columns, and being provided with a block or plate 57 corresponding with each magazine to effectually close it and retain the stays therein. The stays lie longitudinally in the magazines and are agitated therein and caused to drop down singly into the receivers, keeping the receivers always full of stays in superposed alinement, by means of an agitator in each magazine consisting simply of arms 58 extending substantially the length of the magazine and lying parallel with the axis thereof and carried by disks 59. The backs of the arms are shown as curved to correspond with the curvature of the magazines and their contour in cross section is that of a flattened triangle so that the forward edge of each arm will pass under the stays during each rotation of the disk, lift them up, causing them to lie parallel with each other in the magazine, and then pass out from under them. Each disk is carried by a short shaft 60 journaled in a bracket 61 secured to the back plate and provided with a gear wheel 62.

63 denotes idlers journaled on studs 64 projecting from the back plate by which rotation is communicated to the several agitators from a driving gear wheel 65 on a shaft 66 journaled in a bracket 67 and carrying a bevel gear wheel 68 and a driving pulley 69. The machine is driven by means of a belt (not shown) passing over the belt pulley which is loose on the shaft and is connected thereto by means of a clutch 70.

71 denotes guide plates at the sides of the machine, the upper ends of which are secured to a top plate 72 and the lower ends of which are inclined inward toward each other and are supported by brackets 73, their extreme ends being turned downward as at 74. The space between the downwardly turned ends 74 of the guide plates is divided, to form ways 76 and 176, by means of a center plate 77 which is secured to brackets 75, 78 and 67 and to the back plate. Above all the magazines except the upper row are shields 79 which are secured to the back plate and to brackets 80 secured to and extending from the back plate. Below the magazines in the lower row are inner guide plates 81 also secured to brackets 80. These inner guide plates extend downward and inward toward the center plate leaving openings, however, between the lower ends of the guide plates and the center plate, either opening being adapted to be closed by a swinging plate 82 which is pivoted to the upper edge of the center plate and is adapted to be swung downward into engagement with a stop 83 with which each inner guide plate is provided at its lower edge. The swinging plate is manipulated by means of a pivoted handle 84 which extends through a curved slot 85 in the front to place the swinging plate at its mid position as in full lines in Fig. 3, or at either of its closing positions as in dotted lines in Fig. 3, the purpose of which will presently be fully explained. The handle and with it the swinging plate are retained at the mid position by means of a spring 86, (see Fig. 4), which acts to throw the handle into a notch 87 at the apex of the curved slot, (see Fig. 1).

Figure 1:
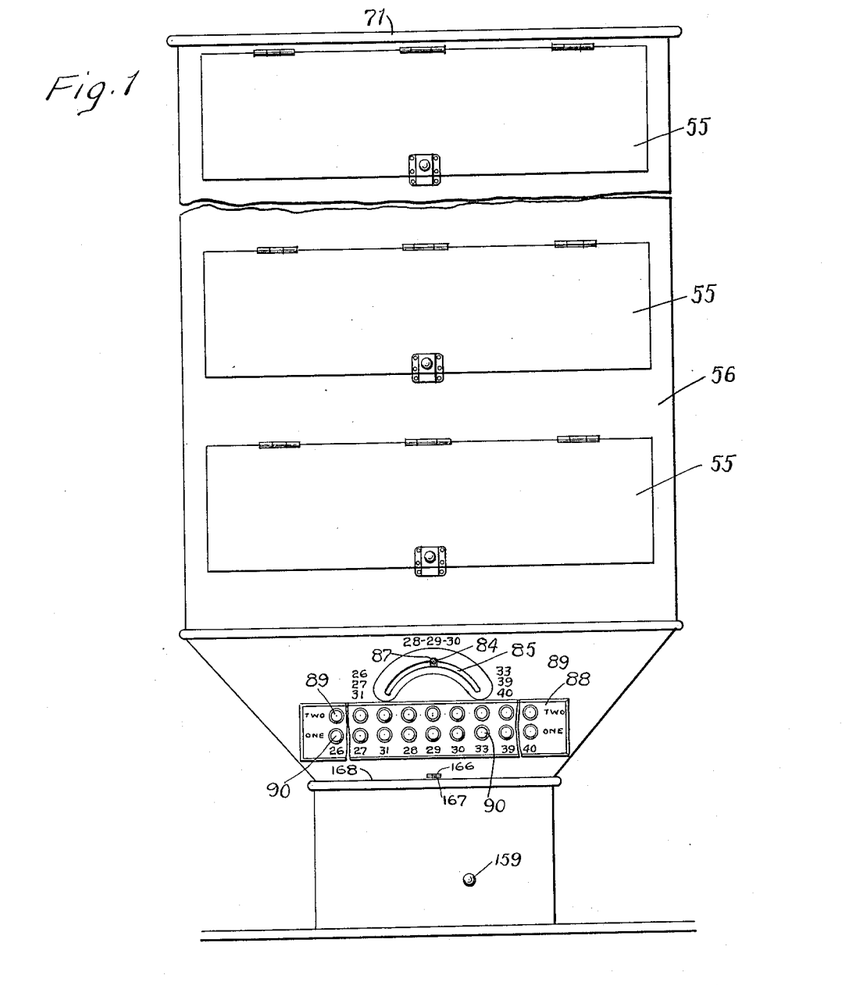
Figure 1 is a front elevation of the machine complete.
Figure 2:
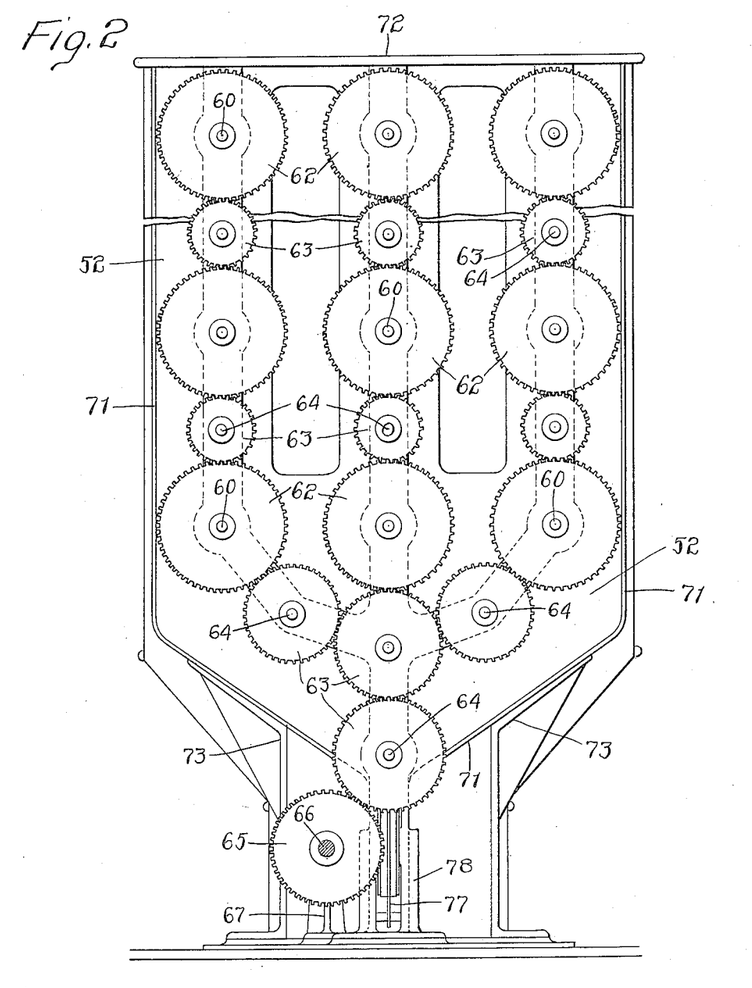
Fig. 2 a rear elevation.
Figure 3:
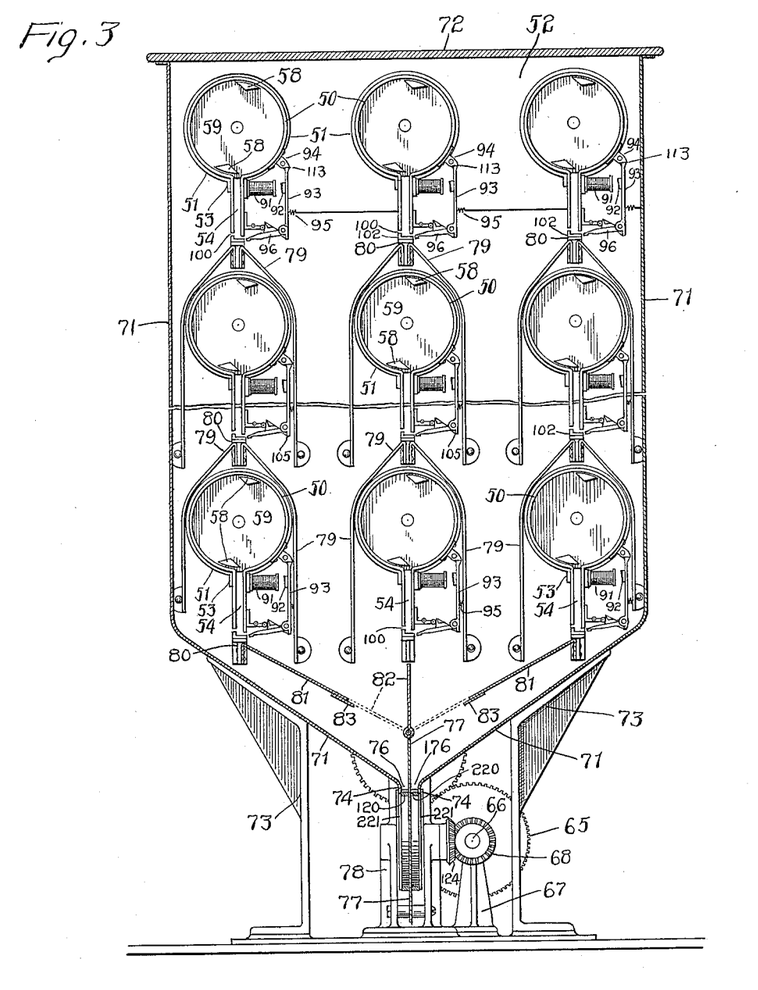
Fig. 3 a section on the line 3—3 in Fig. 4, looking in the direction of the arrows.
Figures 4, 5, 6, 7, 8, 9:
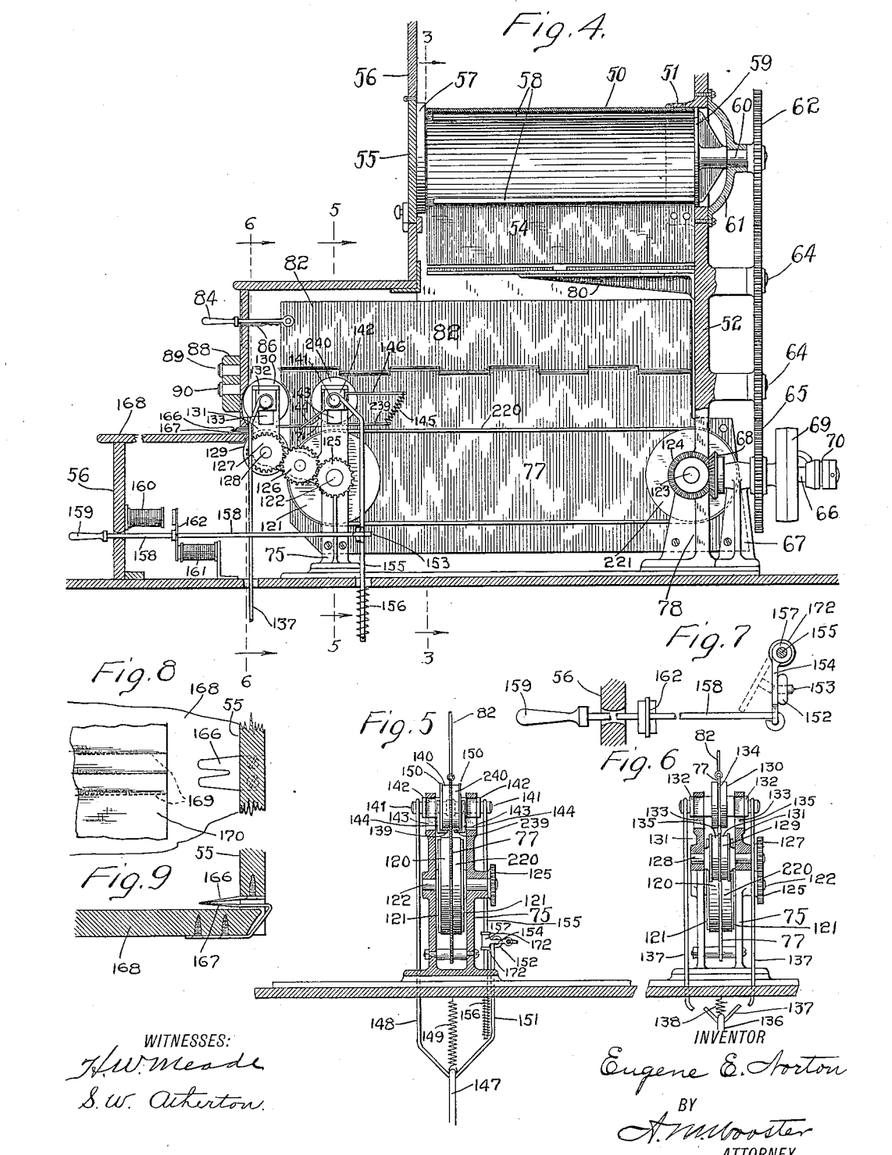
Fig. 4 a central vertical section, the upper magazines being removed and operative parts appearing in elevation.
Fig. 5 a section on the line 5—5 in Fig. 4, looking in the direction of the arrows.
Fig. 6 a section on the line 6—6 in Fig. 4, looking in the direction of the arrows.
Fig. 7 a detail view illustrating one of the treadle connections.
Fig. 8 a detail view showing the table in plan, also the spring fingers and a portion of a corset.
Fig. 9 a sectional view on a plane at right angles to the plane of Fig. 8.
Figures 10, 11, 12, 13, 14, 15, 16, 17, 18:
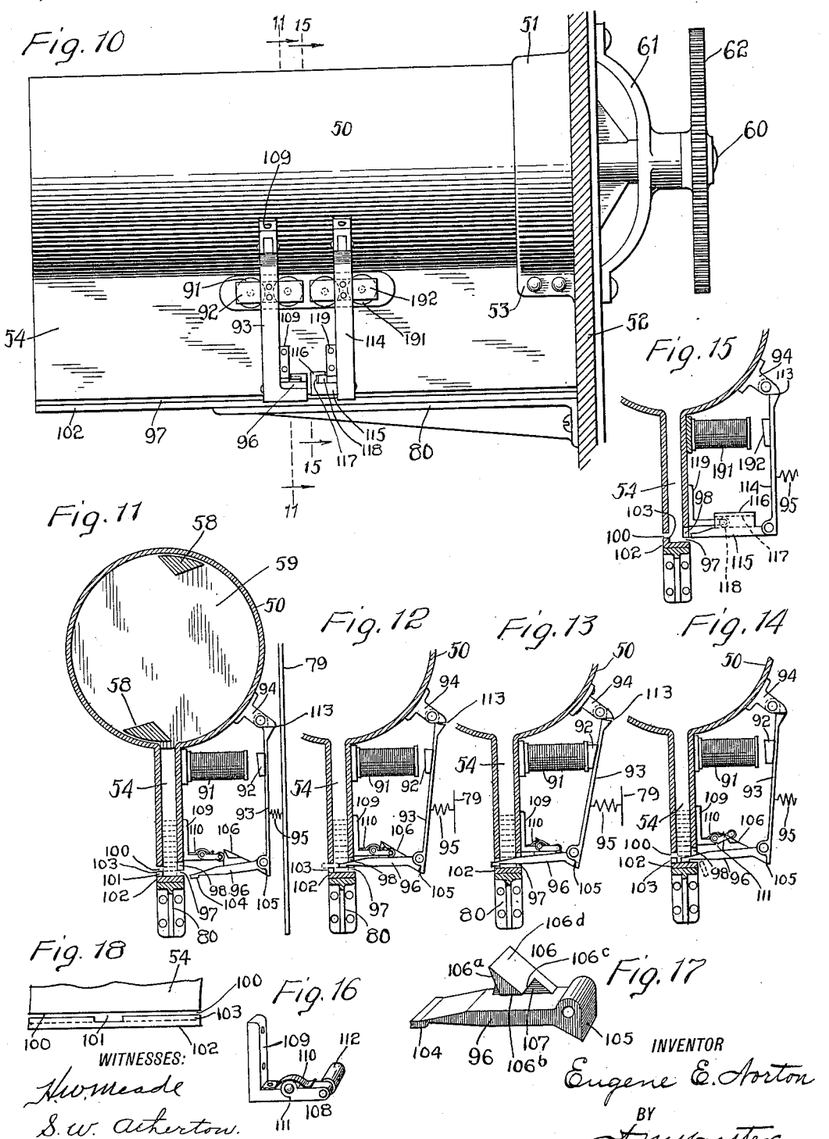
Fig. 10 an elevation on an enlarged scale of one of the magazines and the corresponding ejecting mechanisms.
Fig. 11 a section on the line 11—11 in Fig. 10 looking in the direction of the arrows, with the two-stay ejecting mechanism in elevation.
Figs. 12, 13 and 14 are similar views showing changed positions of the parts.
Fig. 15 a section on the line 15—15 in Fig. 10, looking in the direction of the arrows, the one-stay ejecting mechanism being in elevation.
Figs. 16 and 17 are detail perspective views of parts of a two-stay ejecting mechanism.
Fig. 18 a detail elevation showing the lower end of a receiver and the first or one-stay ejecting slot.

In the machine as illustrated in the drawings provision is shown for handling nine sizes or styles of stays which we will suppose for convenience to be respectively 26, 27, 28, 29, 30, 31, 33, 39 and 40 centimeters in length. The magazines are arranged in three columns and as the 28, 29 and 30-centimeter stays are used most frequently those sizes of stays are placed in the central column, the 26, 27, and 31-centimeter stays are placed in the left column, as seen from the front, and the 33, 39 and 40-centimeter stays are placed in the right column. In using stays from the central column of magazines, handle 84 and the swinging plates are placed in the mid position as shown in Figs. 1, 3 and 4. In using stays from the left column, the handle is pressed downward out of the notch and swung to the left end of the curved slot, carrying the swinging plate to its left position as indicated by dotted lines in Fig. 3, and in using stays from the right column the handle is swung to the right end of the curved slot, which carries the swinging plate to its right position, as indicated by dotted lines in Fig. 3. For the convenience of the operator the numbers 28, 29 and 30 may be placed above the curved slot, the numbers 26, 27 and 31 contiguous to the left end of said slot and the numbers 33, 39 and 40 contiguous to the right end of said slot, it being understood of course that all lengths and widths of stays required in the manufacture of different styles of corsets are handled with equal facility by the machine and as many sizes of stays as may be required may be provided for by increasing the number of the magazines. Below the curved slot, on the front of the machine, is a block or plate 88 in which is arranged a row of push pins 89, corresponding in number with the magazines. The action of these push pins is to cause, through electrical connections presently to be explained, the successive ejection of two stays from the magazine, corresponding with any push pin 89 that may be operated, by a single actuation of the ejecting mechanism, as will presently be explained. Below this row of push pins is another row of push pins, indicated by 90, the action of which is to cause, through electrical connections, the ejection of one stay from the magazine corresponding with any push pin 90 that may be operated. For the convenience of the operator numbers corresponding with the sizes of stays, as for example 26, 27, 31, 28, 29, 30, 33, 39 and 40, may be placed under or over, as preferred, the rows of pins, the pin for causing the ejection of two stays of any required size being placed directly over the pin for causing the ejection of a single stay of the same size. The mechanism for ejecting two stays at a single actuation is illustrated in Figs. 10, 11, 12, 13, 14, 16 and 17, and the mechanism for ejecting a single stay is illustrated in Fig. 15, which see in connection with Fig. 10. I will first describe the mechanism for ejecting two stays. As the ejecting mechanisms for all the magazines are the same, I will for convenience describe one only and use the singular form. 91 denotes an electro magnet secured to the receiver 54. The armature 92 is carried by a swinging arm 93 pivoted to a bracket 94 secured to the magazine. A spring 95 secured to the contiguous shield 79 and to the swinging arm normally retains the armature detached from the electro magnet. When the electro magnet is energized the armature is drawn into contact with the pole or poles thereof against the power of the spring. The swinging arm and the bracket are provided with projections which serve as co-acting stops, as at 113, to limit the backward movement of the swinging arm. 96 denotes an ejector pivoted to the swinging arm and projecting toward the receiver which is provided in the side toward the ejector with a longitudinal slot 97 having communicating therewith on the upper side a recess 98 through which the ejector passes. On the opposite side of the receiver is a longitudinal slot 100 having communicating therewith on the lower side a recess 101 through which the ejector passes. As already explained the receiver is made integral with the magazine and for convenience in manufacturing the bottom of the receiver is a separate plate indicated by 102 which rests upon and is attached to the corresponding bracket 80. This plate is provided on the side farthest from the ejector with an upwardly extending flange 103. It will be noted that the ejector recess 98 is in the receiver proper and ejector recess 101 is in flange 103. The height of flange 103 is just the thickness of a stay, so that in the forward movement of the ejector, presently to be described, the ejector passes through recess 98 and forces the next to the lowest stay in the receiver outward through slot 100. The free end of the ejector is provided on its underside with a lug or projection 104 just the thickness of a stay. After ejecting next to the lowest stay through slot 100 the ejector drops down and projection 104 passes into recess 101 outside the lowest stay in the receiver and when the backward movement of the ejector takes place the lowest stay is drawn out through slot 97. It will be seen that this construction, by ejecting next to the lowest stay in the receiver by the forward movement of the ejector, and then ejecting the lowest stay from the opposite side of the receiver by the backward movement of the ejector, enables me to eject two stays from the receiver at each actuation of the ejector without any lifting of the other stays in the receiver, which simply drop down when the ejector is withdrawn and fill the place occupied by the stays that have been ejected. The ejector is provided with a projection 105 which co-acts with a projection on the swinging arm serving as a stop to limit the downward movement of the ejector when withdrawn. The ejector is provided on its upper side with a cam 106 having in its inner face a groove 107 which co-acts with a pivoted finger 108 carried by a bracket 109 secured to the receiver. A spring 110 acts to retain the finger in its normal position, the finger and bracket being provided with stop walls 111 which limit the downward movement of the finger.

The operation of this portion of the invention is as follows:—When electro magnet 91 is enegized and the armature is drawn from its normal position, as in Fig. 11, into engagement with the pole, wall 106$^a$ of cam 106 will engage a roller 112 carried by the pivoted finger causing the cam to ride up over the roller and lift ejector 96 so that said ejector will pass into recess 98 in the receiver and force the next to the lowest stay out through slot 100 in the opposite side of the receiver. During this forward movement of the ejector the roller will lie in groove 107 in the cam and wall 106$^b$ will retain the ejector raised as in Fig. 12. The instant the finger of the operator is removed from the push pin 89, which has caused the energizing of the electro magnet, the circuit will be broken and spring 95 will return the swinging arm and ejector to their normal position (see Figs. 13 and 14 in connection with Fig. 11). As soon as the next to the lowest stay has been ejected through slot 100 and projection 104 on the ejector has passed the lowest stay the roller will pass out from slot 107 and the ejector will drop down so that projection 104 will lie in recess 101 outside the lowest stay. The backward movement of the ejector will then eject the lowest stay through slot 97 in the receiver. It should be noted that the first or next to the lowest stay is ejected on the left side of the receiver, as seen in Figs. 11 to 14, and the second or lowest stay on the right side. When the backward movement of the ejector commences angular projection 106$^c$ of the cam will lie below the center of roller 112 so that the roller will be caused to ride up wall 106$^d$ of the cam forcing the pivoted finger to swing upward against the power of the spring, as in Fig. 14. As soon as the ejector has reached its normal position, as in Fig. 11, the pivoted finger will drop down in front of the cam, the ejector being then ready for another actuation.

The mechanisms for ejecting a single stay (see Fig. 15) differ only in details of construction. I will describe one only and use the singular form. 114 denotes the swinging arm which is pivoted as before, and 115 the ejector which is pivoted as before, and the slots and recesses in the receiver are as before. The ejector in this form is provided with an enlargement 116 having a groove 117 which receives a roller 118 on a bracket 119 secured to the receiver. As the ejector reciprocates the roller travels in the groove which serves as a guide to retain the ejector in operative position. In ejecting a single stay the lowest stay remains in the receiver. Next to the lowest stay is ejected through slot 100 by the forward movement of the ejector, the backward movement of which performs no function, leaving the lowest stay in the receiver to be ejected by the backward movement of the corresponding ejector 93 the next time that two stays are required from that receiver. 191 denotes the electro magnets for operating ejectors 115, and 192 the corresponding armatures.

It should be noted that a single stay, and in the case of two stays the first stay, is always ejected through slot 100 on the left side of the receiver, as seen in Figs. 3 and 11, and the second stay is ejected through slot 97 on the right side of the receiver. The stays when ejected from the receivers pass to the feeding mechanism presently to be described, said mechanism being adapted to feed a single stay or two stays at a time as may be required. The function of shields 79 is to prevent the possibility of any ejected stay lodging upon a magazine below the one from which it has been ejected and the function of guide plates 71 and inner guide plates 81 is to guide the stays to ways 76 and 176, which are separated by center plate 77. A single or first stay ejected from any receiver in the left column, as seen in Fig. 3, (except of course the lowest) will drop upon the left shield of the magazine below the receiver from which it has been ejected, and then upon the left guide plate 71 down which it will slide edgewise into way 76. When a single stay is to be ejected from any receiver in the left column it is immaterial what may be the position of swinging plate 82, but if two stays are to be ejected from any receiver in the left column, the swinging plate must be swung to the left dotted position as seen in Fig. 3, by moving handle 84 (see Fig. 1) to the left end of slot 85 in the front. When a second stay is ejected, it will drop upon the right shield of the magazine below the receiver from which it has been ejected, then upon the left inner guide plate 81, down which it will slide edgewise and over swinging plate 82 which will carry it past center plate 77 so that it will drop into way 176. When stays are to be ejected either singly or in duplicate from any receiver in the central column, swinging plate 82 is placed at its mid position, as in full lines in Fig. 3. Single stays or the first of two stays will drop upon the left shield below and upon the left inner guide plate 81 down which they will slide edgewise and drop into way 76. Second stays when ejected will drop upon the right shield below, then upon the right inner guide plate down which they will slide edgewise and drop into way 176. When stays are to be ejected either singly or in duplicate from any receiver in the right column, swinging plate 82 must be swung to the right dotted position as seen in Fig. 3, by manipulation of handle 84. Single stays or the first of two stays will drop upon the right shield below and upon the right inner guide plate 81 down which they will slide edgewise and over swinging plate 82 which will carry them past center plate 77 so that they will drop into way 76. When a second stay is ejected it will drop upon the right shield below and upon the right guide plate 71 down which it will slide edgewise into way 176.

Just below the ways are carrying belts 120 and 220 lying on opposite sides of center plate 77 and carried by pulleys 121 and 221 fixed to shafts 122 and 123 journaled in brackets 75 and 78 respectively. Shaft 123 carries a bevel gear wheel 124 which meshes with bevel gear wheel 68 on shaft 66 and receives motion therefrom. Shaft 122 carries a gear wheel 125 meshing with an idler 126 which in turn meshes with a gear wheel 127 on a shaft 128 carrying a lower feed roller 129. The idler shaft and shaft 128 are mounted in arms 131 extending from brackets 75. Above feed roller 129 is an upper feed roller 130 mounted on a shaft carried by boxes 132 adapted to be moved vertically in slots 133 in arms 131. Upper feed roller 130 is provided with a central peripheral groove 134 and lower feed roller 129 is provided with a central flange engaging said groove and with side flanges whereby two channels 135 are formed which receive and guide either a single stay or two stays simultaneously, as may be required. The upper feed roller is controlled by means of a treadle (not shown) from which a rod 136 extends, said rod having branches 137 which extend upward on opposite sides of brackets 75 and are connected to the boxes the upper feed roller. A spring 138 connected to the treadle rod and to a fixed portion of the machine (or to the bench on which the machine stands) normally acts to hold the upper feed roller raised, as in Figs. 4 and 6, said roller being drawn downward against the power of the spring by operation of the treadle rod. Co-acting with the belts as they pass over pulleys 121, carried by brackets 75, are pushers indicated by 139 and 239 and two pusher rollers indicated by 140 and 240. These rollers are mounted to rotate independently and on opposite sides of center plate 77. The shafts 141 of these rollers are carried by boxes 142 adapted to have independent vertical movement in slots 143 in bracket 75. The forward ends of the pushers are supported by guides 144 secured to boxes 142 and the rear ends of the pushers are connected to springs 145, the opposite ends of which are connected to arms 146 secured to the boxes on the sides opposite to the guides (see Fig. 4). Both pusher rollers are provided at their outer edges with flanges 150 which in connection with the guides and the center plate retain the pushers against other than reciprocatory movement. Each pusher is provided with a stop 171 adapted to engage the upper feed roller to limit its forward movement and to engage the corresponding pusher roller to limit its backward movement.

The pusher rollers are controlled by means of mechanism operated by a treadle (not shown) from which a treadle rod 147 extends. A branch 148 extends upward from rod 147 on the left side of bracket 75, as seen in Fig. 5, and is connected to the axle or box of pusher roller 140. A spring 149 connected to the treadle rod and to a fixed portion of the machine (or to the bench on which the machine stands) normally acts to hold pusher roller 140 raised, as in Figs. 4 and 5, said rollers being drawn downward against the power of the spring by operation of the treadle rod. It should be understood that pusher roller 140 acts upon a single stay or upon the first of two stays ejected by a single operation of an ejector. It is necessary therefore that pusher roller 140 be drawn downward to coöperate with the corresponding carrying belt and pulley 121, as will be more fully explained, at each actuation of the treadle rod. Pusher roller 240, however, is only brought into operation where two stays have been ejected by one movement of an ejector and are to be fed simultaneously. Mechanism is therefore provided for connecting and disconnecting pusher roller 240 from treadle rod 147. 151 denotes a rod which branches from treadle rod 147 and extends upward upon the right side of bracket 75, as seen in Fig. 5, and is provided at its upper end with an eye 152. This eye is adapted to be engaged by a lug 153 which projects from an arm 154 adapted to swing on a rod 155, the upper end of which is connected to the axle or box of pusher roller 240. This rod is shown as extending through the bench on which the machine stands, and a spring 156 on the lower end of this rod and bearing against the underside of the bench normally acts to hold pusher roller 240 at the raised position, as in Figs. 4 and 5. The head of arm 154, which is indicated by 157, is shown as retained in place on rod 155 by collars 172. Arm 154 is operated to connect and disconnect rods 155 and 151 by means of an operating rod 158, which extends through the front of the machine and is provided with a handle 159. This rod may be operated manually by means of the handle, or may be operated by means of electro magnets 160 and 161 and an armature 162 secured to operating rod 158. The stays when ejected are received by the carrying belts and carried forward under the pusher rollers and the feed rollers and between upper and lower spring fingers 166 and 167, the forward ends of which lie in engagement and which stop the forward movement of the stays. These spring fingers in duplicate are adapted to pass into the pockets of a corset which is manipulated by the operator on a table indicated by 168. For convenience in description I have shown a portion of a corset (see Fig. 8) which is indicated by 170, and pockets therein are indicated by 169.

Figure 19:
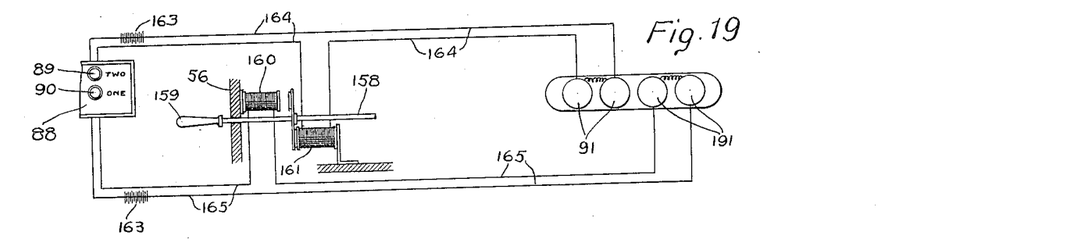
Fig. 19 a diagrammatic view illustrating electrical connections.

Electrical connections are illustrated diagrammatically in Fig. 19. The current may be obtained in any convenient manner, as from a battery or batteries 163 or from a generator, not shown, or a line-wire from an outside source. 164 denotes electrical connections extending from one of the push pins 89, which causes the ejection of two stays from a magazine by a single operation of the corresponding ejector 96, to electro magnet 91. 165 denotes electrical connections extending from one of the push pins 90, which causes the ejection of a single stay from a magazine by operation of the corresponding ejector 115 to electro magnet 191. Suppose for example that a push pin 89 has been operated, the circuit will be closed in electrical connections 164 and electro magnets 91 and 161 will be energized. The energizing of electro magnet 161 will draw armature 162 on the operating rod into engagement with the pole of said magnet and will swing arm 154 and place lug 153 in engagement with eye 152 on rod 151, so that when treadle rod 147 is operated rod 155 will be operated thereby and pusher rollers 140 and 240 will both be placed in operative relation with the corresponding carrying belts and pulleys 121 and both pushers will be actuated, as will presently be explained. The energizing of electro magnet 91 will cause the actuation of the corresponding ejector 96 and the ejection of two stays from the corresponding magazine, as already fully explained. When a push pin 90 is operated the circuit will be closed in electrical connections 165 and electro magnets 191 and 160 will be energized. The energizing of electro magnet 160 will draw armature 162 on the operating rod into engagement with the pole of said magnet and will swing arm 154 to the dotted position shown in Fig. 7, and disengage lug 153 from eye 152 on rod 151, thereby disconnecting rod 155 from rod 151 so that when treadle rod 147 is operated the movement of rod 151 will have no effect upon rod 155 and consequently pusher roller 240 will not be drawn into operative relation with the corresponding carrying belt and pulley 121 and pusher 140 only will be actuated. The energizing of electro magnet 191 will cause the actuation of the corresponding ejector 115 and the ejection of one stay only from the corresponding magazine. It will be noted that no spring is provided to return operating rod 158 after an actuation in either direction, either manually or electrically. Armature 162 will therefore remain in engagement with the pole of the electro magnet to which it has been drawn after the circuit is broken. No result will follow, however, until the electro magnet is again energized, or the other electro magnet (referring to electro magnets 160 and 161) is energized and the armature is drawn into engagement therewith.

Figure 20:
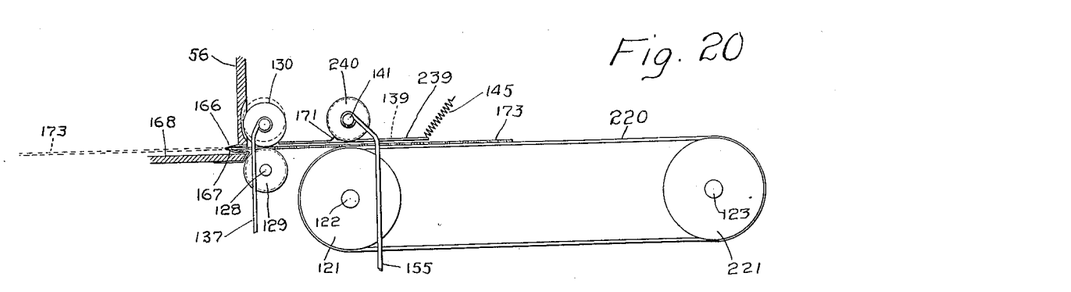
Figs. 20 and 21 are detail views illustrating the operation of inserting a stay in a corset pocket, the corset however being omitted for the sake of clearness in illustration.
Figure 21:
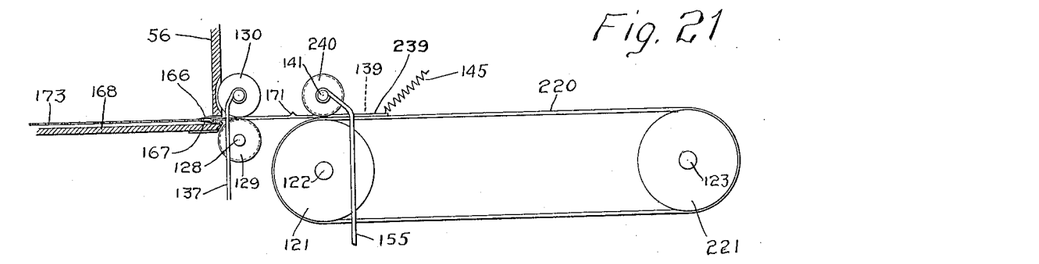

The operation of this portion of the invention is as follows: It has already been explained that single stays and the first of two stays ejected at one actuation of an ejector drop into way 76 and the second stay, where two stays are ejected by one operation of an ejector, drops into way 176. Carrying belt 120 lies just below way 76 and carrying belt 220 just below way 176. The carrying belts and the lower feed roller are moving continuously when the machine is in use and stays that fall upon the belts are carried forward by the belts and lower feed roller under the pushers and the upper feed roller until they are stopped by the spring fingers. The operator now places a corset over the spring fingers which enter the pockets, or one of them enters a pocket if but one stay is to be inserted. Treadle rod 136 is then operated and upper feed roller 130 is drawn down upon the stay or stays under it, depending of course upon whether one or two stays have been ejected, as already explained. The position of the parts at this instant is clearly illustrated in Fig. 20, a stay being indicated by 173. The instant the upper feed roller is drawn downward, the stay or stays will be gripped between the feed rollers and forced forward between the spring fingers, which yield to let them pass, and into the pockets in the corset, as far as the feed rollers will carry them. The operator now draws treadle rod 147 downward. If a push pin 89 has been operated, two stays will have been ejected and fed into the pockets. The connection of rod 155 with rod 151 must of course have been effected either electrically or manually. Operation of treadle rod 147 will therefore draw down both pusher rollers, causing them to grip both pushers between the pusher rollers and the belts as they pass over pulleys 121, the guides and pushers moving downward with boxes 142. The pushers will now be moved forward against the power of springs 145, until stops 171 engage the upper feed rollers, and will pass between the spring fingers and into the pockets (see Fig. 21) and will seat the stays, i. e. push them to the required position in the pockets. The instant the operator releases the treadle rods, spring 149 will return the pusher rollers to their normal position, as in Fig. 5, spring 138 will return the upper feed roller to its normal position as in Fig. 6, and springs 145 will return the pushers to their normal position, as in Fig. 20, the backward movement of the pushers being limited by the engagement of stops 171 with the pusher rollers. The operation of inserting a single stay is precisely the same with the exception that rods 151 and 155 are not connected (see dotted line position of arm 154 in Fig. 7), consequently pusher roller 140 only is drawn downward and pusher 139 only is operated, pusher roller 240 and pusher 239 remaining inoperative. The operations of ejecting, feeding and inserting stays, either singly or in duplicate, are thus enabled to be performed with great rapidity.

Having thus described my invention I claim:

1. In a machine of the character described, the combination with a plurality of magazines, of mechanism for ejecting a stay from a predetermined magazine and mechanism for inserting an ejected stay in a corset pocket.

2. In a machine of the character described, the combination with a plurality of magazines, of mechanism for ejecting two stays successively from a predetermined magazine, and mechanism for inserting said stays simultaneously in corset pockets.

3. In a machine for inserting stays in corsets, the combination with a plurality of magazines and receivers into which the stays drop, of reciprocating ejectors and means for actuating a predetermined ejector to cause the ejection of a stay from the corresponding receiver.

4. In a machine of the character described, the combination with a magazine, of means for ejecting stays therefrom and means for inserting said stays in corset pockets.

5. In a machine of the character described, the combination with a magazine, of means for ejecting two stays successively therefrom and means for inserting the said stays simultaneously in corset pockets.

6. In a machine for inserting stays in corsets, the combination with a magazine and a receiver into which the stays drop, of an ejector reciprocating transversely to the receiver, whereby a stay is ejected from opposite sides of the receiver by each forward and backward movement of the ejector.

7. In a machine for inserting stays in corsets, the combination with a magazine, and a receiver into which the stays drop and which is provided with slots in opposite sides, of an ejector reciprocating transversely to the receiver whereby a stay is ejected from each slot at each reciprocation of the ejector.

8. In a machine for inserting stays in corsets, the combination with a magazine and a receiver, of an agitator in the magazine by which the stays are caused to drop singly into the receiver, an ejector for removing stays therefrom, and means for inserting ejected stays in corset pockets.

9. In a machine of the character described, the combination with a magazine and a receiver into which stays drop singly in superposed alinement, of an agitator in the magazine, an ejector for removing two stays from the receiver at each reciprocation.

10. In a machine for inserting stays in corsets, the combination with a cylindrical magazine and a receiver, of an agitator consisting of rotating disks and arms carried thereby, the backs of which correspond with the curvature of the magazine and which are flattened triangles in cross section and the forward edges of which lift the stays causing them to lie parallel and to drop singly into the receiver, and an ejector for removing stays in the receiver.

11. In a machine for inserting stays in corsets, the combination with a magazine, an agitator therein, and a receiver into which the stays drop singly in superposed alinement, of a reciprocating ejector adapted to remove a stay from each side of the receiver at each reciprocation.

12. In a machine for inserting stays in corsets, the combination with a cylindrical magazine and a rotating agitator having arms which lift the stays therein and cause them to lie parallel, of a receiver into which the stays drop in superposed alinement and an ejector for removing two stays from the receiver at each reciprocation.

13. In a machine for inserting stays in corsets, the combination with a cylindrical magazine and a rotating agitator having arms which lift the stays therein and cause them to lie parallel, of a receiver into which the stays drop in superposed alinement and an ejector which reciprocates transversely to the receiver and is adapted to eject a stay from each side of the receiver at each reciprocation.

14. In a machine for inserting stays in corsets, the combination with a plurality of magazines and rotating agitators in the magazines which lift the stays and cause them to lie parallel, of receivers into which the stays drop in superposed alinement, an ejector corresponding with each receiver and means for actuating a predetermined ejector for removing a stay from the corresponding receiver.

15. In a machine for inserting stays in corsets, the combination with a plurality of magazines and rotating agitators in the magazines which lift the stays and cause them to lie parallel, of receivers into which the stays drop in superposed alinement, a reciprocating ejector corresponding with each receiver and adapted to remove a stay from each side thereof at each reciprocation and means for actuating any predetermined ejector.

16. In a machine of the character described, the combination with a receiver for stays in superposed alinement, of an ejector reciprocating transversely to the receiver for ejecting stays therefrom and means for inserting ejected stays in corset pockets.

17. In a machine of the character described, the combination with a receiver for stays in superposed alinement, of a reciprocating ejector adapted to remove a stay from each side of the receiver at each reciprocation.

18. In a machine of the character described, the combination with a receiver for stays in superposed alinement, having upon one side at the bottom a slot and upon the other side a flange whose height equals the thickness of a stay and above the flange a slot, of a transversely reciprocating ejector having on its underside a lug, the forward movement of the ejector removing next to the lowest stay through the second mentioned slot and the return movement causing the lug to remove the lowest stay through the first mentioned slot.

19. In a machine of the character described, the combination with a receiver having upon one side at the bottom a slot and above the slot a recess and upon the other side a flange, whose height equals the thickness of a stay and which is provided with a recess, and above the flange a slot, of a reciprocating ejector, having on its underside a lug, which passes through the first mentioned recess and removes next to the lowest stay at the forward movement, then drops down, the lug entering the second mentioned recess and removing the lowest stay by its backward movement.

20. In a machine of the character described, the combination with a receiver and a reciprocating ejector having upon its upper side a cam, of a pivoted finger having a roller over which the cam rides to raise the ejector during the forward movement, the ejector then dropping down and the roller riding over the cam on the return movement.

21. In a machine of the character described, the combination with a receiver and a reciprocating ejector having upon its underside a lug and upon its upper side a cam, of a pivoted finger having a roller over which the cam rides to raise the ejector into position to remove next to the lowest stay from the receiver by its forward movement, the ejector then dropping down and the roller riding over the cam and the lug removing the lowest stay by the return movement.

22. In a machine of the character described, the combination with a receiver and a reciprocating ejector having upon its upper side a cam, of a pivoted spring-controlled finger and a roller carried by said finger over which the cam rides to raise the ejector, for the purpose set forth, during the forward movement, the ejector then dropping down and the roller riding over the cam during the return movement.

23. In a machine of the character described, the combination with a receiver having slots in opposite sides, one slot the thickness of a stay above the other, and a reciprocating ejector having upon its under side a lug and upon its upper side a cam, of a pivoted finger and a roller carried by said finger over which the cam rides to raise the ejector and remove the next to the lowest stay by the forward movement, the ejector then dropping down and the roller riding over the cam and the lug removing the lowest stay by the return movement.

24. In a machine of the character described, the combination with a receiver and a reciprocating ejector having upon its upper side a cam, of a pivoted finger over which the cam is adapted to ride to raise the ejector, for the purpose set forth, during the forward movement, the ejector then dropping down and the finger riding over the cam, for the purpose set forth, during the return movement.

25. In a machine of the character described, the combination with a receiver having slots in opposite sides, one slot the thickness of a stay above the other, of means for removing next to the lowest stay from the higher slot and for removing the lowest stay from the lower slot at each actuation.

26. In a machine of the character described, the combination with a receiver having slots in opposite sides, one slot the thickness of a stay above the other, of a reciprocating ejector and means for raising the ejector to remove next to the lowest stay from the higher slot by its forward movement, the ejector then dropping down and removing the lowest stay from the lower slot by its return movement.

27. In a machine of the character described, the combination with a receiver, and a magazine for supplying stays thereto in superposed alinement, of a reciprocating ejector for removing stays therefrom and means for inserting ejected stays in corset pockets.

28. In a machine of the character described, the combination with a receiver, and means for supplying stays thereto in superposed alinement, of means for ejecting stays therefrom and means for inserting ejected stays in corset pockets.

29. In a machine of the character described, the combination with a receiver, of a swinging arm having an armature, an ejector pivoted to the swinging arm for removing stays from the receiver, means for inserting ejected stays in corset pockets, an electro-magnet and electrical connections with which the armature co-acts, and means for returning the swinging arm and the ejector to their normal position when the circuit is broken.

30. In a machine of the character described, the combination with a receiver, a swinging arm having an armature and an ejector pivoted to the swinging arm for removing stays from the receiver, of means for inserting ejected stays in corset pockets, an electro-magnet and electrical connections with which the armature co-acts, a spring for returning the swinging arm and the ejector when the circuit is broken and stops to retain the swinging arm and the ejector at their normal position.

31. In a machine of the character described, the combination with a magazine, a receiver for stays in superposed alinement and an agitator in the magazine for causing stays to drop into the receiver singly, of a swinging arm pivoted to the magazine, an armature carried thereby, an ejector pivoted to the swinging arm for removing stays from the receiver, an electro-magnet carried by the receiver and means for returning the swinging arm and ejector to their normal position.

32. In a machine of the character described, the combination with a magazine, a receiver for stays in superposed alinement and an agitator in the magazine for causing stays to drop into the receiver singly, of a swinging arm pivoted to the magazine, an armature carried thereby, an ejector pivoted to the swinging arm for removing stays from the receiver, an electro-magnet carried by the receiver, a spring for returning the swinging arm and ejector when the circuit is broken and stops for retaining the swinging arm and ejector in their normal position.

33. In a machine of the character described, the combination with a magazine, a receiver for stays in superposed alinement and an agitator in the magazine for causing stays to drop into the receiver singly, of a swinging arm pivoted to the magazine, an armature carried thereby, an ejector pivoted to the swinging arm and having a cam, and a pivoted finger over which the cam rides, for the purpose set forth, during the forward movement, the ejector dropping down and the finger riding over the cam during the return movement.

34. In a machine of the character described, the combination with a magazine, a receiver for stays in superposed alinement and having slots in opposite sides thereof and an agitator in the magazine, for the purpose set forth, of a swinging arm pivoted to the magazine, an armature carried thereby, an ejector pivoted to the swinging arm for removing a stay from each slot at each actuation, an electro-magnet and means for returning the swinging arm and ejector to their normal position when the circuit is broken.

35. In a machine for inserting stays in corsets, the combination with a magazine, a receiver to which the stays pass therefrom and which is provided on opposite sides with slots, one slot the thickness of a stay above the other, of a swinging arm pivoted to the magazine, an armature carried thereby, an ejector pivoted to the swinging arm for removing next to the lowest stay by the forward movement and for removing the lowest stay by the return movement, an electromagnet carried by the receiver and means for returning the swinging arm and ejector when the circuit is broken.

36. In a machine for inserting stays in corsets, the combination with a magazine, a receiver to which the stays pass therefrom and which is provided on opposite sides with slots, one slot the thickness of a stay above the other, of a swinging arm pivoted to the magazine, an armature carried thereby, an ejector pivoted to the swinging arm and having a lug on its underside, an electromagnet and a spring for returning the ejector when the circuit is broken, the ejector removing next to the lowest stay through the higher slot by its forward movement and the lug removing the lowest stay through the lower slot by the return movement.

37. In a machine of the character described, the combination with a plurality of magazines and receivers for stays corresponding therewith, of swinging arms, armatures carried thereby, ejectors pivoted to the swinging arms for removing stays from the receivers, means for inserting ejected stays in corset pockets, electro-magnets with which the armatures co-act, electrical connections for energizing any predetermined magnet and means for returning the swinging arms and ejectors to their normal position when the circuit is broken.

38. In a machine of the character described, the combination with a plurality of magazines, and receivers for stays corresponding therewith, of swinging arms, armatures carried thereby, ejectors pivoted to the swinging arms and having on their upper sides cams, pivoted fingers engaged by the cams to raise the ejectors during the forward movement, the fingers riding over the cams on the return movement, electromagnets with which the armatures co-act, electrical connections for energizing any predetermined magnet and means for returning the swinging arms and ejectors when the circuit is broken.

39. In a machine of the character described, the combination with a plurality of magazines and receivers for stays corresponding therewith and provided on opposite sides with slots, one slot the thickness of a stay above the other, of swinging arms, armatures carried thereby, ejectors pivoted to the swinging arms and having lugs on their under sides, electro-magnets with which the armatures co-act, electrical connections and springs for returning the swinging arms and ejectors, whereby a stay is ejected from each slot at each reciprocation of an ejector.

40. In a machine of the character described, the combination with a receiver and means for ejecting stays therefrom, of a carrying belt upon which the stays drop and means for inserting ejected stays in corset pockets.

41. In a machine of the character described, the combination with a plurality of receivers and means for ejecting stays from a predetermined receiver, of a carrying belt and means for guiding stays from any receiver to the carrying belt.

42. In a machine of the character described, the combination with a plurality of receivers and means for ejecting stays from a predetermined receiver, of two carrying belts, a center plate between them and means for guiding ejected stays to each carrying belt.

43. In a machine of the character described, the combination with feeding mechanism comprising a carrying belt, feed rollers, a pusher and pusher rollers, of a receiver, means for ejecting stays therefrom and means for guiding the stays to the carrying belt.

44. In a machine of the character described, the combination with feeding mechanism comprising a carrying belt, feed rollers, a pusher and pusher rollers, of a plurality of receivers, means for ejecting stays from a predetermined receiver and means for guiding ejected stays to the carrying belt.

45. In a machine of the character described, the combination with feeding mechanism comprising duplicate carrying belts, feed rollers, duplicate pushers and independent pusher rollers for each pusher, of a plurality of receivers, means for ejecting stays from a predetermined receiver and means for guiding ejected stays to the carrying belts respectively.

46. In a machine of the character described, the combination with feeding mechanism for two stays, of a plurality of receivers, means for ejecting two stays from a predetermined receiver and means for guiding ejected stays to the feeding mechanism.

47. In a machine of the character described, the combination with feeding mechanism, of a plurality of receivers, means for ejecting stays from a predetermined receiver and means for guiding ejected stays to the feeding mechanism.

48. In a machine for inserting stays in corsets, the combination with feeding mechanism, a plurality of magazines, receivers to which the stays pass therefrom and mechanism for ejecting stays from opposite sides of a predetermined receiver, of shields above the magazines upon which stays from the receivers drop, for the purpose set forth, guide plates and inner guide plates, a center plate and a swinging plate hinged to the center plate and co-acting with the inner guide plates whereby ejected stays are guided independently to the feeding mechanism.

49. In a machine of the character described, the combination with feeding mechanism, a plurality of receivers and mechanism for ejecting stays from opposite sides of a predetermined receiver, of guide plates, inner guide plates, a center plate and a swinging plate hinged to the center plate and co-acting with either inner guide plate, for the purpose set forth.

50. In a machine of the character described, the combination with feeding mechanism, a plurality of receivers and mechanism for ejecting stays from opposite sides of a predetermined receiver, of inner guide plates and a swinging plate adapted to coöperate with either inner guide plate, for the purpose set forth.

51. In a machine of the character described, the combination with carrying belts, a center plate between them, a plurality of receivers and mechanism for ejecting stays from opposite sides of a predetermined receiver, of means coöperating with the center plate for guiding stays to either carrying belt.

52. In a machine of the character described, the combination with carrying belts, a center plate between them, a plurality of receivers and mechanism for ejecting stays from opposite sides of a predetermined receiver, of inner guide plates and a swinging plate hinged to the center plate and adapted to co-act with either guide plate.

53. In a machine of the character described, the combination with carrying belts, and means for supplying stays thereto, of means for inserting the stays in corset pockets.

54. In a machine of the character described, the combination with a carrying belt and feed rollers, of a pusher and a pusher roller whereby stays delivered to the belt are passed into corset pockets and then pushed to the required position therein.

55. In a machine of the character described, the combination with a carrying belt and spring fingers into which stays are carried by the belt, of feed rollers by which stays are passed through the spring fingers and into corset pockets and a pusher by which the stays are seated in the pockets.

56. In a machine of the character described, the combination with two carrying belts, mechanism for delivering a stay to one or to both belts and spring fingers into which stays are carried by the belts, of feed rollers by which stays are passed through the spring fingers and into corset pockets, pushers by which the stays are seated in the pockets, two pusher rollers for actuating the pushers and means for placing one or both pusher rollers in operative position.

57. In a machine of the character described, the combination with two carrying belts, mechanism for delivering a stay to one or to both belts and spring fingers into which stays are carried by the belts, of feed rollers by which stays are passed through the spring fingers and into corset pockets, two pushers by which the stays are seated in the pockets and which are provided with stops two pusher rollers for actuating the pushers and means for placing one or both pusher rollers in operative position, the stops on the pushers engaging the feed rollers to limit their forward movement and the pusher rollers to limit their backward movement.

58. In a machine of the character described, the combination with two carrying belts, mechanism for delivering a stay to one or to both belts and spring fingers into which stays are carried by the belts, of upper and lower feed rollers by which stays are passed through the spring fingers and into corset pockets, pushers by which the stays are seated in the pockets and which are provided with stops, for the purpose set forth, two pusher rollers for actuating the pushers and means for placing one or both pusher rollers in operative position.

59. In a machine of the character described, the combination with two carrying belts, pulleys by which said belts are carried, mechanism for delivering a stay to one or to both belts and spring fingers into which stays are carried by the belts, of feed rollers by which stays are passed through the spring fingers and into corset pockets, pushers by which the stays are seated in the pockets, two pusher rollers coöperating with the belts and pulleys and means for placing one or both pusher rollers in operative position.

60. In a machine of the character described, the combination with two carrying belts, mechanism for delivering a stay to one or to both belts and upper and lower spring fingers, the forward ends of which lie in engagement and which stop the forward movement of the stays, of feed rollers by which stays are passed through the spring fingers and into corset pockets, two pushers by which the stays are seated in the pockets and means for actuating one or both pushers.

61. In a machine of the character described, the combination with two carrying belts, means for delivering stays to one or both belts and spring fingers into which stays are passed by the belts, of upper and lower feed rollers, means for placing the upper feed rollers in operative position to pass stays through the spring fingers and into corset pockets, two pushers by which the stays are seated in the pockets, and means for operating one or both pushers.

62. In a machine of the character described, the combination with stay receivers, means for ejecting stays therefrom and carrying belts, of spring fingers which stop the forward movement of the stays, feed rollers by which the stays are passed through the spring fingers and into corset pockets and pushers by which the stays are seated in the pockets.

63. In a machine of the character described, the combination with stay receivers, means for ejecting stays therefrom and carrying belts, of means for guiding stays to either carrying belt and means for seating the stays in corest pockets.

64. In a machine of the character described, the combination with two carrying belts, means for delivering stays to one or both belts and spring fingers into which stays are passed by the belts, of feed rollers, two pushers, for the purpose set forth, and means for actuating one or both pushers.

65. In a machine of the character described, the combination with two carrying belts and means for delivering stays to one or both belts, of two pushers for seating stays in corset pockets and means for actuating one or both pushers.

66. In a machine of the character described, the combination with carying belts, pulleys by which they are carried, pushers and two pusher rollers coöperating with the belts and pulleys to actuate the pushers, of independently movable boxes by which the pusher rollers are carried, connections by which one pusher roller is placed in operative position, connections by which the other pusher roller is placed in operative position and means for connecting and disconnecting said pusher roller connections.

67. In a machine of the character described, the combination with carrying belts, pulleys by which they are carried, pushers, and two pusher rollers coöperating with the belts and pulleys to actuate the pushers, of independently movable boxes by which the pusher rollers are carried, connections by which one pusher roller is placed in operative position, a rod extending from said connections and provided with an eye, a rod by which the other pusher roller is placed in operative position, a swinging arm on said rod adapted to engage the eye and means for operating said rod, for the purpose set forth.

68. In a machine of the character described, the combination with a plurality of stay receivers and means for ejecting a stay from one or both sides of a predetermined receiver at each actuation, of carrying belts, two pushers coöperating therewith for inserting stays in corset pockets, and connections for causing the actuation of one or both pushers.

69. In a machine of the character described, the combination with a plurality of stay receivers and ejecting mechanism for each receiver, of carrying belts and pushers coöperating therewith, for the purpose set forth.

70. In a machine of the character described, the combination with a plurality of stay receivers, mechanism for ejecting a single stay from each receiver, and mechanism for ejecting two stays from each receiver, of a push pin corresponding with the one stay ejecting mechanism of each receiver, a push pin corresponding with the two stay ejecting mechanism of each receiver and electrical connections between each push pin and the corresponding ejecting mechanism.

71. In a machine of the character described, the combination with a plurality of stay receivers, mechanism for ejecting a single stay from each receiver and mechanism for ejecting two stays from each receiver, of controlling means for each ejecting mechanism, and electrical connections between the controlling means and the ejecting mechanisms.

72. In a machine of the character described, the combination with a plurality of stay receivers and stay ejecting mechanisms, of push pins corresponding with the ejecting mechanisms, electrical connections and means for inserting ejected stays in corset pockets.

73. In a machine of the character described, the combination with a plurality of stay receivers and corresponding ejecting mechanisms, of electrical connections for actuating any predetermined ejecting mechanism and means for inserting ejected stays in corset pockets.

74. In a machine for inserting stays in corsets, the combination with a plurality of magazines, agitators therein and receivers into which the stays drop, of ejecting mechanisms corresponding with the receivers and electrical connections for actuating any predetermined ejecting mechanism.

75. In a machine of the character described, the combination with a plurality of stay receivers, corresponding ejecting mechanisms and electrical connections for actuating any predetermined ejecting mechanism, of means for inserting ejected stays in corset pockets.

76. In a machine of the character described, the combination with a plurality of stay receivers, corresponding ejecting mechanisms and electrical connections for actuating any predetermined ejecting mechanism, of a carrying belt and a pusher.

77. In a machine of the character described, the combination with a plurality of stay receivers, corresponding ejecting mechanisms and electrical connections for actuating any predetermined ejecting mechanism, of a carrying belt, feed rollers, a pusher and operating means therefor.

78. In a machine of the character described, the combination with a plurality of stay receivers, corresponding ejecting mechanisms and electrical connections for actuating any predetermined ejecting mechanism, of a carrying belt, upper and lower feed rollers, a pusher roller, and a pusher having a stop adapted to engage the upper feed roller and the pusher roller to limit its forward and backward movements.

79. In a machine of the character described, the combination with a plurality of stay receivers, corresponding ejecting mechanisms and electrical connections for actuacting any predetermined ejecting mechanism, of carrying belts, pulleys therefor, pushers, two pusher rollers and means for placing one or both pusher rollers in operative relation to the carrying belts and pulleys.

80. In a machine of the character described, the combination with a plurality of stay receivers, corresponding ejecting mechanisms and electrical connections for actuating any predetermined ejecting mechanism, of independent carrying belts and means for guiding ejected stays to either carrying belt.

81. In a machine of the character described, the combination with a plurality of stay receivers, corresponding ejecting mechanisms and electrical connections for actuating any predetermined ejecting mechanism, of carrying rollers, a center plate between them, inner guide plates and a swinging plate hinged to the center plate and co-acting with either inner guide plate to guide stays to either carrying belt.

82. In a machine of the character described, the combination with a plurality of stay receivers, corresponding ejecting mechanisms and electrical connections for actuating any predetermined ejecting mechanism, of carrying belts, spring fingers into which stays are passed by the belts, feed rollers for passing stays through the spring fingers and into corset pockets and pushers for seating the stays in the pockets.

83. In a machine of the character described, the combination with a plurality of stay receivers, corresponding ejecting mechanisms, corresponding push pins and electrical connections between the push pins and the ejecting mechanisms, of carrying belts, pushers, pusher rollers and electrical connections controlled by the push pins for placing the pusher rollers in operative position.

84. In a machine of the character described, the combination with stay carrying belts, pushers and pusher rollers, of push pins and electrical connections controlled thereby for placing the pusher rollers in operative position.

85. In a machine of the character described, the combination with a plurality of stay receivers, corresponding ejecting mechanisms and electrical connections for actuating any predetermined ejecting mechanism, of carrying belts, pushers, pusher rollers, movable boxes for said rollers, stay guides secured to the boxes and means for lowering the pusher rollers into operative position.

86. In a machine of the character described, the combination with a plurality of stay receivers, corresponding ejecting mechanisms and electrical connections for actuating any predetermined ejecting mechanism, of carrying belts, pushers, pusher rollers for actuating the pushers, springs for returning the pushers when released and means for placing the pusher rollers in operative position.

87. In a machine of the character described, the combination with a back plate having flanges and downwardly extending lips and tubular magazines which receive stays endwise and are extended downward between the lips to form receivers, of agitators in the magazines for causing the stays to drop into the receivers and ejectors for removing stays from the receivers.

88. In a machine of the character described, the combination with a back plate having flanges and downwardly extending lips and tubular magazines which receive stays endwise and are extended downward between the lips to form receivers, of a front, doors hinged thereto and carrying plates to close the magazines and means for removing stays from the receivers.

89. In a machine of the character described, the combination with a back plate having flanges and downwardly extending lips and tubular magazines which receive stays endwise and are extended downward beween the lips to form receivers, of means for ejecting stays from the receivers, carrying belts and means for guiding ejected stays to either carrying belt.

90. In a machine of the character described, the combination with a back plate having flanges and downwardly extending lips and tubular magazines which receive stays endwise and are extended downward between the lips to form receivers, of means for ejecting stays from the receivers, carrying belts, means for guiding ejected stays to either carrying belt and means for inserting stays in corset pockets.

91. In a machine of the character described, the combination with stay receivers and means for ejecting stays therefrom, of means for inserting stays in corset pockets.

92. In a machine of the character described, the combination with magazines for stays, receivers into which the stays pass in superposed alinement, ejectors for removing stays from the receivers and means for inserting stays in corset pockets.

93. In a machine of the character described, the combination with stay receivers, means for ejecting stays therefrom, carrying belts upon which they drop and means for inserting the stays in the corset pockets.

94. In a machine of the character described, the combination with a receiver, of means for ejecting stays therefrom, means by which the stays are partly inserted in corset pockets, and pushers for seating the stays therein.

95. In a machine of the character described, the combination with feeding mechanism for two stays, of a plurality of receivers, means for ejecting either one or two stays from a predetermined receiver, means by which the stays are partly inserted in corset pockets, pushers, and means for actuating said pushers to seat ejected stays in corset pockets.

96. In a machine of the character described, the combination with carrying belts and means for supplying stays thereto, of means for inserting the stays in corset pockets.

In testimony whereof I affix my signature in presence of two witnesses.

EUGENE E. NORTON.

Witnesses:
S. W. ATHERTON,
A. M. WOOSTER.

Copies of this patent may be obtained for five cents each, by addressing the "Commissioner of Patents, Washington, D. C."